US009886656B2

(12) United States Patent
Chen et al.

(10) Patent No.: US 9,886,656 B2
(45) Date of Patent: Feb. 6, 2018

(54) MANAGING PRIVACY OF INFORMATION DURING SHIPMENTS

(71) Applicant: International Business Machines Corporation, Armonk, NY (US)

(72) Inventors: Jia L. Chen, Ningbo (CN); Bing Fang, Ningbo (CN); Gao Y. Ruan, SuZhou (CN); You You, Ningbo (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/860,898

(22) Filed: Sep. 22, 2015

(65) Prior Publication Data

US 2017/0083802 A1     Mar. 23, 2017

(51) Int. Cl.
*G06K 19/06*      (2006.01)
*H04L 9/30*       (2006.01)

(52) U.S. Cl.
CPC ......... *G06K 19/06037* (2013.01); *H04L 9/30* (2013.01)

(58) Field of Classification Search
CPC . G06K 19/06037; H04L 9/30; H04L 63/0442; H04L 63/0428; H04L 51/34; H04L 12/5885; H04L 51/046; H04L 51/28; H04L 63/0435; H04L 67/22; H04L 2463/102; G06Q 10/107; G06Q 10/10; G06Q 20/382
See application file for complete search history.

(56) References Cited

U.S. PATENT DOCUMENTS

| 6,748,366 | B1 | 6/2004 | Hurwitz et al. |
| 7,325,127 | B2 * | 1/2008 | Olkin .................. H04L 12/5875 |
| | | | 713/152 |
| 7,536,360 | B2 | 5/2009 | Stolfo et al. |
| 8,805,747 | B2 | 8/2014 | Zimberoff et al. |
| 8,812,373 | B2 | 8/2014 | Johnson |

(Continued)

FOREIGN PATENT DOCUMENTS

| CN | 103455900 A | 12/2013 |
| CN | 103530753 A | 1/2014 |
| CN | 103870947 A | 6/2014 |

OTHER PUBLICATIONS

Wu et al., "A Study of Anonymous Delivery Based on Blind Signature Scheme", Procedia Computer Science 52 (2015), pp. 1065-1070.

(Continued)

*Primary Examiner* — Catherine Thiaw
(74) *Attorney, Agent, or Firm* — Erik K. Johnson

(57) ABSTRACT

A method for managing privacy of information on a shipping label associated with a shipment is provided. The method includes receiving information associated with the shipment, generating at least two decryption keys associated with at least two pieces of information from the information, generating encrypted messages by encrypting the at least two pieces of information based on the at least two decryption keys including a first and second encrypted message encrypted based on a first and second decryption key, respectively, generating a machine-readable code including the encrypted messages, generating a shipping label including machine-readable code, and providing the first and second decryption keys based on a first and second status of the shipment, respectively.

15 Claims, 8 Drawing Sheets

(56) References Cited

U.S. PATENT DOCUMENTS

| | | | |
|---|---|---|---|
| 2001/0044785 A1 | 11/2001 | Stolfo et al. | |
| 2002/0013739 A1* | 1/2002 | O'Donnell | G06Q 10/08 705/26.81 |
| 2003/0208411 A1* | 11/2003 | Estes | G06Q 10/08 705/65 |
| 2004/0249652 A1* | 12/2004 | Aldstadt | G06Q 10/08 705/28 |
| 2008/0111674 A1* | 5/2008 | Quine | G06Q 10/08 340/501 |
| 2008/0208772 A1* | 8/2008 | Rundle | G06Q 10/08 705/410 |
| 2009/0100263 A1* | 4/2009 | Leonard | H04L 51/00 713/156 |
| 2010/0217979 A1* | 8/2010 | Yaghmour | H04L 12/5875 713/168 |
| 2010/0230328 A1* | 9/2010 | Bonnell | B07C 3/18 209/584 |
| 2011/0154042 A1* | 6/2011 | Gremaud | H04N 7/1675 713/171 |
| 2012/0143709 A1 | 6/2012 | Shakes | |
| 2014/0279474 A1* | 9/2014 | Evans | G06Q 20/3572 705/41 |

OTHER PUBLICATIONS

Webpage printout from: https://angel.co/anonymous-shipping, printed on Sep. 10, 2015, 4 pages.
Webpage printout from: http://www.anonymousshipping.com/default.aspx, printed on Aug. 31, 2015, 1 page.

* cited by examiner

Shipping info (FIG. 6A)

| Public info | | |
|---|---|---|
| Nickname | John | (601) |
| City | New York | (602) |
| Zip Code | 12345 | (603) |

| Encrypted info | | |
|---|---|---|
| Full Name | John D. Doe | (604) |
| Detailed Address | 123 45th St. Suite 678 New York, NY | (605) |
| Phone No. | 123-456-7890 | (606) |

Confirm (607) / Cancel (608)

FIG. 6A

Shipping info (as Sender) (FIG. 6B)

| Public info | | |
|---|---|---|
| Nickname | John | (611) |
| City | New York | (612) |
| Zip Code | 12345 | (613) |

| Encrypted info | | |
|---|---|---|
| Full Name | *Ciphered text* | (614) |
| Detailed Address | *Ciphered text* | (615) |
| Phone No. | *Ciphered text* | (616) |

Confirm (607) / Cancel (608)

FIG. 6B

MANAGING PRIVACY OF INFORMATION DURING SHIPMENTS

BACKGROUND

The present invention generally relates to managing privacy of information during shipments, and more particularly to managing privacy of information on a shipping label used in delivery shipments.

Shipping labels, for example used in express delivery of packages, may contain information relevant to the shipment of a package, such as the receiver's name, street address, phone number, etc. and/or the sender's name, street address, phone number, etc. Such information may be printed on the shipping label as visible, readable text. During the shipment of the package, various personnel in the shipment chain may use such information to deliver the package and such information may facilitate express or rapid delivery.

Shipping labels may include shipping information encoded in two-dimensional, machine-readable codes or may include shipping information as ciphered text. Some or all information on the shipping label, such as sensitive, personal information of a receiver or sender, may nonetheless leak, e.g., to non-authorized, non-relevant personnel.

SUMMARY

According to one embodiment, a method for managing privacy of information on a shipping label associated with a shipment is provided. The method may include receiving a plurality of pieces of information associated with the shipment, generating at least two decryption keys associated with at least two pieces of information from the plurality of pieces of information, generating two or more encrypted messages by encrypting the at least two pieces of information based on the at least two decryption keys including a first and second encrypted message encrypted based on a first and second decryption key, respectively, generating a machine-readable code including the two or more encrypted messages, generating the shipping label including the machine-readable code, and providing the first and second decryption keys based on a first and second status of the shipment, respectively.

According to another embodiment, a computer program product for managing privacy of information on a shipping label associated with a shipment is provided. The computer program product may include at least one computer readable non-transitory storage medium having computer readable program instructions for execution by a processor. The computer readable program instructions include instructions for receiving a plurality of pieces of information associated with the shipment, generating at least two decryption keys associated with at least two pieces of information from the plurality of pieces of information, generating two or more encrypted messages by encrypting the at least two pieces of information based on the at least two decryption keys including a first and second encrypted message encrypted based on a first and second decryption key, respectively, generating a machine-readable code including the two or more encrypted messages, generating the shipping label including the machine-readable code, and providing the first and second decryption keys based on a first and second status of the shipment, respectively.

According to another embodiment, a computer system for managing privacy of information on a shipping label associated with a shipment is provided. The system may include at least one processing unit, at least one computer readable memory, at least one computer readable tangible, non-transitory storage medium, and program instructions stored on the at least one computer readable tangible, non-transitory storage medium for execution by the at least one processing unit via the at least one computer readable memory. The program instructions include instructions for receiving a plurality of pieces of information associated with the shipment, generating at least two decryption keys associated with at least two pieces of information from the plurality of pieces of information, generating two or more encrypted messages by encrypting the at least two pieces of information based on the at least two decryption keys including a first and second encrypted message encrypted based on a first and second decryption key, respectively, generating a machine-readable code including the two or more encrypted messages, generating the shipping label including the machine-readable code, and providing the first and second decryption keys based on a first and second status of the shipment, respectively.

BRIEF DESCRIPTION OF THE SEVERAL VIEWS OF THE DRAWINGS

The following detailed description, given by way of example and not intended to limit the invention solely thereto, will best be appreciated in conjunction with the accompanying drawings, in which:

FIGS. 6A-6E illustrate exemplary graphical user interfaces associated with a method for managing privacy of information on a shipping label associated with a shipment, according to an embodiment.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Various embodiments of the present invention will now be discussed with reference to FIGS. 1-7, like numerals being used for like and corresponding parts of the various drawings.

According to one embodiment, provided is a method for managing privacy of information on a shipping label associated with a shipment by generating at least two decryption keys associated with at least two pieces of information from a plurality of pieces of information associated with the shipment, generating two or more encrypted messages by encrypting the at least two pieces of information based on the at least two decryption keys, generating a machine-readable code including the two or more encrypted messages, generating the shipping label including the machine-readable code, and providing the at least two decryption keys based on the status of the shipment. The two or more encrypted messages include a first encrypted message encrypted based on a first decryption key and a second encrypted message encrypted based on a second decryption key, and the first decryption key is associated with a first status of the shipment that is different from a second status of the shipment associated with the second decryption key. The first decryption key is provided based on the first status of the shipment and the second decryption key is provided based on the second status of the shipment.

The method, computer program products, and systems disclosed herein may enhance the privacy and security of sensitive information on a shipping label (e.g., sensitive information associated with a receiver of a shipment) by separately encrypting two or more pieces of sensitive information and providing decryption keys at separate times during the shipment, e.g., associated with two or more different statuses of the shipment. For example, a first piece of information (e.g., the receiver's detailed address) may be encrypted based on a first decryption key, which may be provided when the status of the shipment is in a first state (e.g., when a package is being sorted at a sorting facility) and a second piece of information (e.g., the receiver's phone number) may be encoded based on a second decryption key, which may be provided when the status of the shipment is in a second state (e.g., when a delivery person is ready to confirm the delivery time and address).

The method, computer program products, and systems disclosed herein may enhance the privacy and security of sensitive information on a shipping label, for example, during the express delivery of packages, or when a package is sent from one party to another party via a third party (e.g., a delivery service).

The method, computer program products, and systems disclosed herein may also preserve the anonymity of a receiver and/or enhance the privacy and security of the receiver's sensitive information on a shipping label, in particular, from the sender of the package and/or non-relevant personnel at a delivery service.

Figure 1:
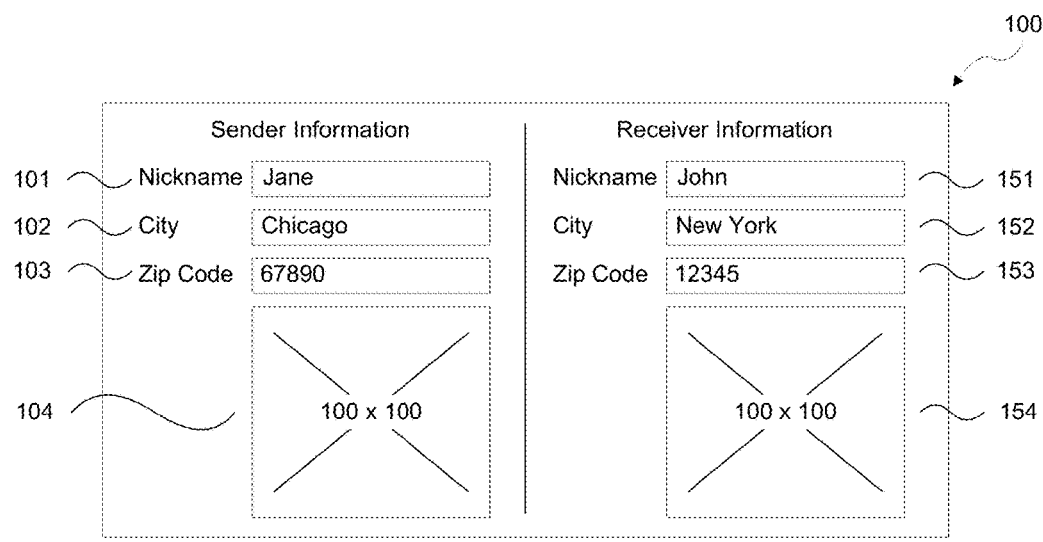
FIG. 1 illustrates an exemplary shipping label containing an exemplary machine-readable code, according to an embodiment.

FIG. 1 illustrates an exemplary shipping label 100 associated with a shipment, according to an embodiment. Shipping label 100 may include information associated with the shipment, some of which may be visible, non-encrypted/non-encoded, and some of which may be encrypted and encoded in a machine-readable code (e.g., a two-dimensional, machine-readable code). In this exemplary embodiment, the visible, non-encrypted/non-encoded information may include information (e.g., non-sensitive information) associated with the sender of the shipment, such as a nickname for the sender 101, the sender's city 102, and the sender's postal code 103, and information associated with the receiver of the shipment, such as a nickname for the receiver 151, the receiver's city 152, and receiver's postal code 153.

The encrypted information may include sensitive information associated with the receiver of the shipment, such as the receiver's full name, the receiver's detailed address, and the receiver's phone number. The receiver's encrypted information may be encoded in an exemplary machine-readable code, such as two-dimensional, machine-readable code 154, which may be, e.g., a quick response or QR Code™. The encrypted information may also include sensitive information associated with the sender of the shipment, such as the sender's full name, the sender's detailed address, and the sender's phone number. The sender's encrypted information may be encoded in an additional two-dimensional, machine-readable code 104 associated with the sender, which may be, e.g., a QR Code™. It will be appreciated that the embodiment disclosed herein describes encoding encrypted information into a two-dimensional, machine-readable code; however, the machine-readable codes disclosed and claimed herein may include any known or contemplated machine-readable code format that may, e.g., be printed on a shipping label, such as a linear barcodes (or one-dimensional barcodes) including universal product codes ("UPCs"), matrix barcodes (or two-dimensional barcodes) and the like.

Encrypted information may be encrypted by any known or contemplated encryption methods, such as any single-key encryption algorithm (e.g., data encryption standard ("DES")).

Figure 2:
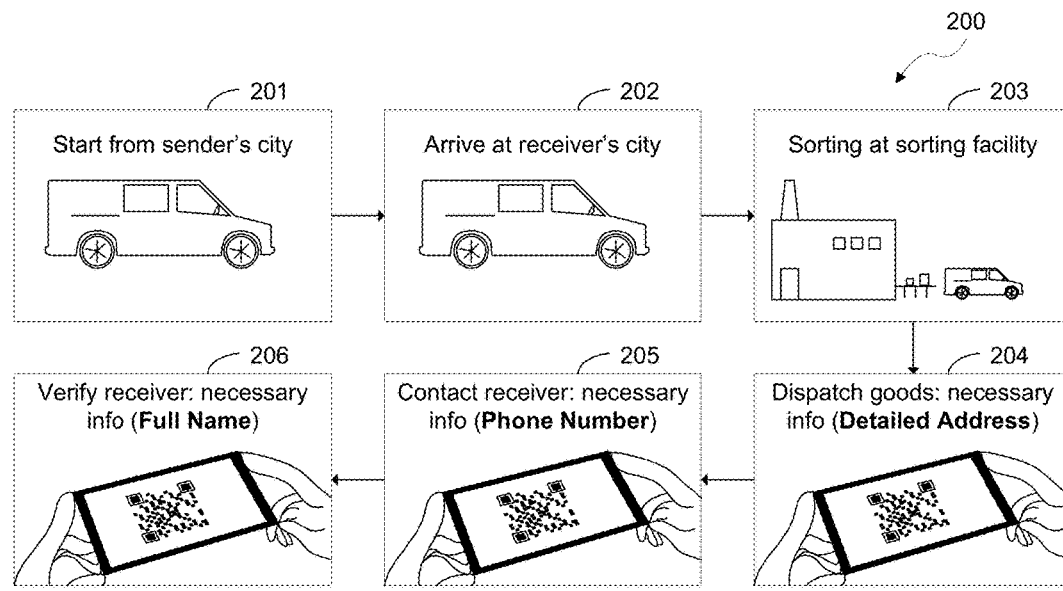
FIG. 2 is a flowchart illustrating an exemplary shipment of a package, according to an embodiment.

FIG. 2 illustrates a first flowchart 200 depicting an exemplary shipment of a package, according to an embodiment. At 201, a package (e.g., affixed with shipping label 100) is obtained at the sender's city (or a location near the sender's location). For example, the package is picked up by an express delivery service or the sender leaves the package at a facility associated with an express delivery service (e.g., a package intake facility). Upon an initial determination of the package's destination, e.g., at an initial sorting facility, the package is routed to the receiver's city (or a location near the receiver's city that includes a sorting facility associated with the express delivery service). At 202, the package arrives at the receiver's city (or a location near the receiver's city). At 203, the package arrives at a sorting facility (e.g., a second sorting facility) in or near the receiver's city where the package is prepared for dispatching to the receiver. It will be appreciated that the sender's city and the receiver's city may be the same city or the sender's location and the receiver's location may be near to each other such that the shipping facility associated with initially accepting/sorting a package for shipment may be the same facility associated with sorting the package for delivery to the receiver.

At 204, the package is ready for dispatching and necessary information is obtained from the shipping label, for example, by scanning a machine-readable code (e.g., a two-dimensional, machine-readable code) on the shipping label and decrypting a first encrypted piece of information (e.g., the receiver's detailed address), i.e., the status of the shipment is in a sorting or dispatching state. This step may alternatively occur, or similarly occur, at an initial sorting facility as an initial sorting step (not shown). For example, an initial sorting worker may obtain (and decrypt) the first encrypted piece of information (e.g., the receiver's detailed address) to determine an appropriate second sorting facility (e.g., nearest to, or otherwise convenient and/or efficient for delivery to, the receiver's address). The package is then sorted and dispatched to the appropriate facility or delivered to the receiver.

The decryption key for the first encrypted piece of information may be provided when the status of the shipment is in an associated state. For example, if the first encrypted piece of information pertains to a sorting/dispatching of the package, the first decryption key may be provided when the status of the shipment is in a sorting/dispatching state. However, if the status of the shipment is not in the associated state, then the decryption key may not be provided. The method, computer program products, and systems disclosed herein may limit the decryption of various pieces of encrypted information by providing the respective decryption keys at predetermined times during the shipment (i.e., when the shipment has a predetermined status).

At 205, a delivery person is ready to deliver the package to the receiver, i.e., the status of the shipment is in a delivering state. Necessary information is obtained from the shipping label, for example, by scanning the two-dimensional, machine-readable code on the shipping label and decrypting a second encrypted piece of information (e.g., the receiver's phone number). For example, a delivery person may be ready to deliver the package to the receiver and may use the second piece of (decrypted) information to contact the receiver to confirm a delivery time and address.

At 206, the package is ready to be handed over to the receiver and the receiver's identity is ready to be verified, i.e., the status of the shipment is in a verifying state. Necessary information is obtained from the shipping label, for example, by scanning the two-dimensional, machine-readable code on the shipping label and decrypting a third encrypted piece of information (e.g., the receiver's full name). For example, the delivery person may be ready to hand over the package to the receiver and may use the third piece of (decrypted) information to verify the identity of the receiver.

Figure 3:
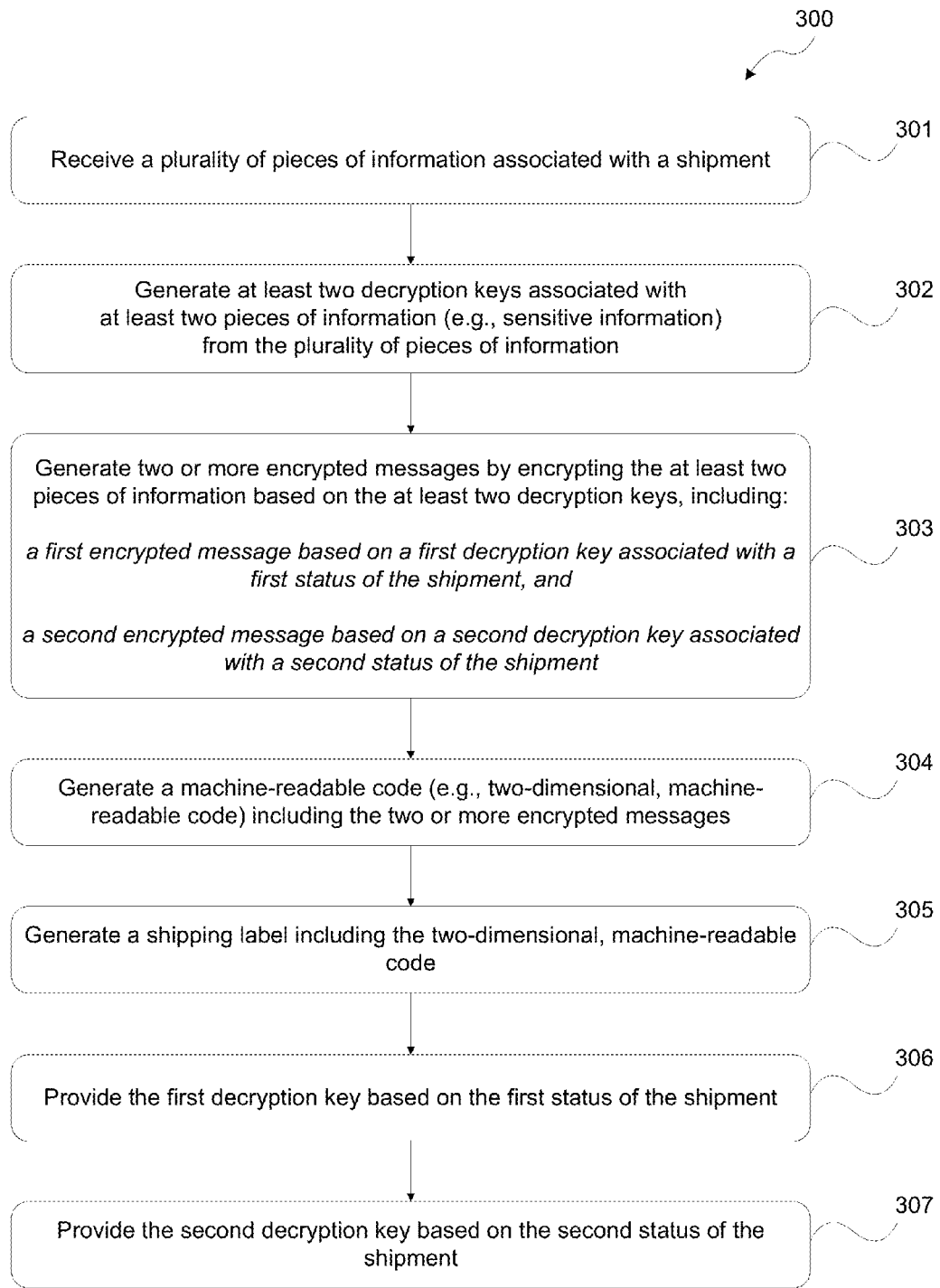
FIG. 3 is a flowchart illustrating a method for managing privacy of information on a shipping label associated with a shipment, according to an embodiment.

FIG. 3 illustrates a second flowchart 300 depicting an exemplary method for managing privacy of information on a shipping label associated with a shipment, according to an embodiment. At 301, a plurality of pieces of information associated with the shipment is received. The plurality of pieces of information may include at least one of information associated with a receiver of a shipment and information associated with a sender of a shipment. In one embodiment, at least one piece of information from the plurality of pieces of information is obtained from an online shopping website. For example, a receiver of the shipment may be a shopper at an online shopping website who provides information associated with the receiver, e.g., sensitive information, such as, the receiver's full name, detailed address, phone number, etc.

At 302, at least two decryption keys associated with at least two pieces of information from the plurality of pieces of information is generated. For example, the at least two pieces of information may pertain to sensitive information, e.g., of a receiver of a shipment or a sender of a shipment.

At 303, two or more encrypted messages are generated by encrypting the at least two pieces of information based on the at least two decryption keys. The two or more encrypted messages include a first encrypted message based on a first decryption key associated with a first status of the shipment and a second encrypted message based on a second decryption key associated with a second status of the shipment. For example, the first encrypted message may pertain to the receiver's detailed address and the message may be encrypted based on a first decryption key associated with a delivery status relevant to the receiver's detailed address, e.g., determining a sorting facility to direct the shipment. The second encrypted message may pertain to the receiver's phone number and that message may be encrypted based on a second decryption key associated with a delivery status relevant to the receiver's phone number, e.g., confirming a delivery time and address.

At 304, a machine-readable code (e.g., a two-dimensional, machine-readable code) including the two or more encrypted messages is generated. The encrypted messages may be encoded in the machine-readable code, which may be decoded by a scanner (or device configured to decode messages encoded in the machine-readable code) and decrypted with an appropriate decryption key. The machine-readable code may also include one or more non-encrypted messages.

At 305, a shipping label including the machine-readable code is generated. For example, a shipping label may be printed with the machine-readable code. In one embodiment, a shipping label may comprise the machine-readable code. For example, a machine-readable code may be printed and serve as a shipping label without any visible, non-encoded shipping information.

At 306, the first decryption key based on the first status of the shipment is provided. For example, the first decryption key may be associated with a sorting/dispatching status and is provided when the delivery status is in a sorting/dispatching state.

At 307, the second decryption key based on the second status of the shipment is provided. For example, the second decryption key may be associated with a confirming delivery time/address status and is provided when the delivery status is in a confirming delivery time/address state.

Figure 4:
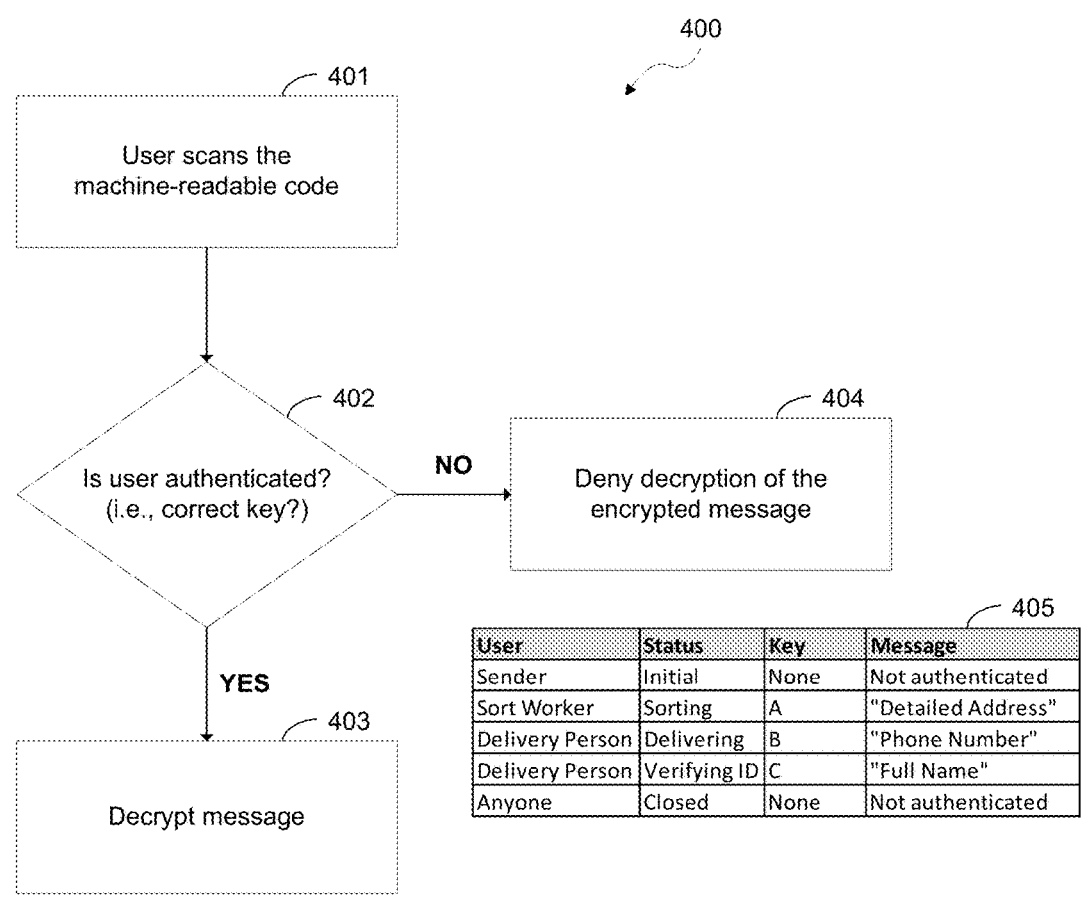
FIG. 4 is a flowchart and user table illustrating an aspect of a method for managing privacy of information on a shipping label associated with a shipment, according to an embodiment.

FIG. 4 illustrates a third flowchart 400 and an exemplary user table 405 depicting an aspect of an exemplary method for managing privacy of information on a shipping label associated with a shipment, according to an embodiment. At 401, a user scans a machine-readable code (e.g., two-dimensional, machine-readable code) on the shipping label with a device capable of capturing images and a processor to decode messages encoded in the machine-readable code, such as a scanner configured to decode messages encoded in the machine-readable code. The machine-readable code may include two or more encrypted messages.

At 402, the user may be authenticated for decrypting an encrypted message encoded in the machine-readable code. For example, the user's scan of the machine-readable code is assessed for an appropriate decryption key associated with an encrypted message. If the user has the appropriate decryption key, the encrypted message may be decrypted and provided to the user, at 403. If the user does not have the appropriate decryption key, the encrypted message may not be decrypted, at 404. In one embodiment, if the user does not have the appropriate decryption key, ciphered text is provided instead of the decrypted message.

Exemplary user table 405 provides exemplary users, statuses of delivery, decryption keys, and decrypted messages. For example, a sender of a shipment may not have any decryption keys and therefore may not view any encrypted messages. A sorting worker may be provided a decryption key associated with a sorting status of the shipment and may decrypt and view a message associated with the sorting status, e.g., the detailed address of the receiver. A delivery person may be provided a decryption key associated with a delivering status of the shipment, which may include confirming delivery time and address. The associated decryption key may decrypt a message associated with the delivering status, e.g., the phone number of the receiver. A delivery person may also be provided a decryption key associated with a verifying status of the shipment, which may include verifying the identification of the receiver. The associated decryption key may decrypt a message associated with the verifying status, e.g., the full name of the receiver. In one embodiment, after the delivery of the shipment to the receiver has been completed, e.g., the status of the shipment has been closed, software associated with decrypting the encrypted message(s) may lock out further decryption of the encrypted message(s).

In one embodiment, software on a scanning device determines the status of the shipment and determines whether to decrypt an encrypted message encoded in the machine-readable code. For example, a scanning device associated with the first status of the shipment determines that the status of the shipment is closed (i.e., the shipment has been delivered to the receiver) or is no longer in the first status and as a result no longer decrypts the first encrypted message (despite having the first decryption key). Similar processes may apply to other scanning devices and other statuses of the shipment.

Figure 5:
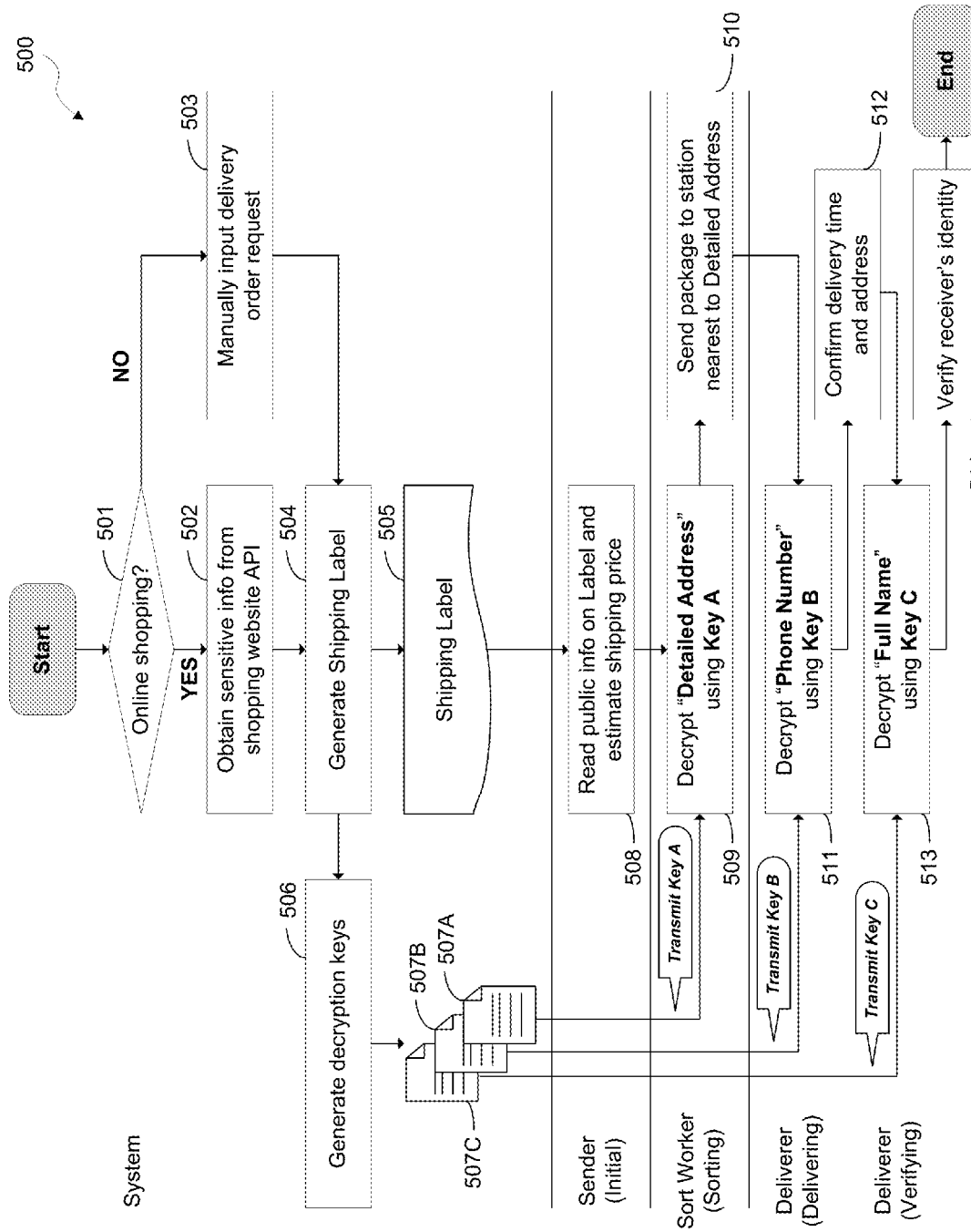
FIG. 5 is a flowchart illustrating additional aspects of a method for managing privacy of information on a shipping label associated with a shipment, according to an embodiment.

FIG. 5 illustrates a fourth flowchart 500 depicting additional aspects of an exemplary method for managing privacy of information on a shipping label associated with a shipment, according to an embodiment. In one aspect, fourth flowchart 500 illustrates steps, instructions, operations, and items (e.g., 501-507C) that may be carried out, obtained, executed, and generated, respectively, by a system associated with a delivery service. In another aspect, fourth flowchart 500 illustrates how various items (e.g., 505, 507A-507C) are handled by, or transmitted to, various users when the status of the shipment is in different states (e.g., initial state, sorting state, delivering state, verifying state).

At 501, a shipping request may be submitted from an online shopping website, e.g., a website with an application program interface (API) configured to provide shipping information to a shipping service, or the shipping request may be submitted from another source. The shipping information from the online shopping website API may include sensitive information about the receiver and/or sender of the shipment. For example, a consumer (who will become the receiver of the shipment) may order an item from an online shopping website and provide to the online shopping website shipping information related to the consumer. The online shopping website may submit the shipping request to the shipping delivery service (and the item to be shipped may be sent to an initial sorting/intake facility associated with the shipping delivery service, or the shipping delivery service may otherwise obtain the item to be shipped).

Another source for a shipping request may include a receiver's or sender's device, e.g., computer, mobile device, etc. Other sources may include any device configured to provide shipping information about a shipment (e.g., receiver and/or sender's detailed address, full name, phone number, etc.) including, but not limited to, a kiosk, a computer system associated with a delivery service (e.g., a computer system operated by delivery service personnel, phone systems, etc.).

If the shipping request is from an online shopping website, e.g., a website with an API configured to provide shipping information to a shipping service, at 502, the shipping information including sensitive information about the shipment may be obtained from the website, e.g., from the website's API.

If the shipping request is from another source, at 503, shipping information may be "manually" provided to the delivery service. The shipping information may provided to the delivery service along with the shipping request, e.g., as entries on an electronic shipping request form in pre-configured fields associated with the shipping request form. The shipping information provided may include sensitive information about the shipment.

At 504, a shipping label associated with the requested shipment may be generated based on the shipping information obtained or otherwise provided. One or more pieces of sensitive information included with the shipping request may be encoded into a machine-readable code (e.g., a two-dimensional, machine-readable code). One or more pieces of other (e.g., "non-sensitive") shipping information, such as a receiver/sender's nickname, postal code, phone number, etc., may be provided (on the shipping label) as visible, non-encoded/non-encrypted, text, and may be considered "public" information.

Generation of the shipping label may be performed by any known or contemplated method in the art, for example, by extracting information from various databases and other sources and organizing the information into a predetermined format. In one embodiment, shipping label 505 may be generated by a printer, e.g., by printing the shipping information in a predetermined format onto a blank label. Shipping label 505 may include visible, non-encoded/non-encrypted information associated with the receiver and/or sender and may also include one or more machine-readable codes containing encrypted information associated with the receiver and/or sender. In one embodiment, shipping label 505 may be shipping label 100 (depicted in FIG. 1).

At 506, decryption keys associated with two or more pieces of information (e.g., sensitive information) may be generated. The decryption keys may form a basis with which to encrypt the two or more pieces of information into encrypted messages that may be encoded into one or more machine-readable codes that are included in the shipping label. At least two of the decryption keys may be associated with a different status of the shipment (e.g., sorting, delivering, verifying a receiver's identity, etc.). In this embodiment, three decryptions (i.e., 507A, 507B, 507C) associated with three pieces of information are generated.

At 508, the status of the shipment is in an initial state. A sender of the shipment may read public information printed on shipping label 505, for example, a receiver's city and/or postal code, and may use such information to estimate shipping costs for the shipment, which may be communicated to the receiver. The sender, however, may not decrypt encrypted messages (containing, e.g., sensitive receiver information) encoded in the machine-readable code printed on shipping label 505.

At 509, the status of the shipment is in a sorting state, for example, at an initial sorting/intake facility. During the sorting state, a first decryption key 507A (Key A), may be transmitted to a user or device associated with the sorting state of the shipment, e.g., a sorting worker or sorting device, which may be used to decrypt a first encrypted message containing a first piece of (sensitive) information, e.g., the receiver's detailed address. The decrypted information may be used to determine an appropriate second sorting facility (e.g., nearest to, or otherwise convenient and/or efficient for delivery to, the receiver's address).

At 510, the package may be sent to the appropriate second sorting facility.

At 511, the status of the shipment is in a delivering state. For example, the package has been received at the appropriate second sorting facility and may be ready to be delivered in-person to the receiver by a delivery person. During the delivering state, a second decryption key 507B (Key B), may be transmitted to an user or device associated with the delivering state of the shipment, e.g., a delivery person or device associated with the delivery person, which may be used to decrypt a second encrypted message containing a second piece of (sensitive) information, e.g., the receiver's phone number. In one embodiment, the first decryption key 507A (Key A) may also be provided, for example, to enable the delivery person to decrypted the first encrypted message containing the receiver's detailed address.

At 512, a delivery person may use the receiver's (decrypted) phone number to contact the receiver to confirm a delivery time and/or address.

At 513, the status of the shipment is in a verifying state, for example, when the delivery person may be with the receiver and/or may be ready to obtain the receiver's signature (e.g., to accept/confirm delivery of the package). During the verifying state, a third decryption key 507C (Key C), may be transmitted to an user or device associated with the verifying state of the shipment, e.g., the delivery person or device associated with the delivery person, which may be used to decrypt a third encrypted message containing a third piece of (sensitive) information, e.g., the receiver's full name.

At 514, the delivery person may use the receiver's (decrypted) full name to verify the receiver's identity. Delivery status of the shipment may be considered closed (i.e., all states have been completed) after the delivery person verifies the receiver's identify (and optionally obtains the receiver's signature) and leaves the package with the receiver.

In one embodiment, the third decryption key 507C (Key C) may be transmitted after a delivery time and/or address are confirmed. For example, a delivery person may use the receiver's (decrypted) phone number to contact the receiver and after confirming a delivery time and/or address, the delivery person may notify the delivery service, e.g., via a device associated with the delivery person, that a delivery time and/or address are confirmed and the shipment will be in a verifying state in a relatively short period of time. The decryption key associated with the verifying state may be transmitted upon receiving such notification. This embodiment may allow the delivery person to access the next decryption key without requiring network access, e.g., to a system/network associated with the delivery service. The notification of the delivery status may include any known or contemplated form of notification including, but not limited to, electronic notification messages, etc.

In one embodiment, a notification associated with the sorting status is received. The notification may be sent by a user or device associated with the sorting state of the shipment and may pertain to commencing, conducting, and/or completing the sorting of the package.

In one embodiment, a notification associated with the delivering status is received. The notification may be sent by a user or device associated with the delivering state of the shipment and may pertain to commencing, conducting, and/or completing the delivering of the package.

In one embodiment, a notification associated with the verifying status is received. The notification may be sent by a user or device associated with the verifying state of the shipment and may pertain to commencing, conducting, and/or completing the verification of the receiver's identity.

FIGS. 6A-6E illustrate various exemplary graphical user interfaces (GUIs) that may be displayed on devices associated with the GUIs and/or a delivery service. A device may include an image capturing device (e.g., camera, lens, etc.) and/or scanner and processor configured to decode messages encoded in a machine-readable code (e.g., a two-dimensional, machine-readable code, such as a QR Code™). In one embodiment, the device may be a user's mobile device, such as a smart phone or the like. The GUIs disclosed herein may represent a single GUI from different perspectives (e.g., different users) and/or during different states of shipment status.

FIG. 6A illustrates an exemplary GUI associated with a method for managing privacy of information on a shipping label associated with a shipment from the perspective of a receiver of the shipment (receiver GUI 600), according to an embodiment. Receiver GUI 600 may include fields in a first section associated with information that may be visible, non-encrypted/non-encoded text (i.e., "public information") on a shipping label and a second section associated with information that may be encrypted and encoded into a machine-readable code included on the shipping label (i.e., "sensitive information" or encrypted information).

The fields associated with public information may include a nickname field 601, a city field 602, and a postal code (or ZIP code) field 603. The receiver may populate these fields with information that other users may refer to during the shipment process without having to obtain a decryption key.

The fields associated with encrypted information may include a full name field 604, a detailed address field 605, and a phone number field 606. The receiver may populate these fields with information that may be used during the shipment process, e.g., at various stages of the shipment process, but will be encrypted and encoded into a machine-readable code. The detailed address may include a house number, building number, suite, street address, etc.

Receiver GUI 600 may also include various buttons associated with an application associated with the GUI and/or delivery service, such as a confirmation button 607 and a cancellation button 608. Information provided through receiver GUI 600 may be provided to a delivery service. For example, the information provided in the described fields may be transmitted to a delivery service after the user/receiver selects the confirmation button 607.

In one embodiment, the information provided in the fields associated with the encrypted information (e.g., the full name field 604, the detailed address field 605, the phone number 606) respectively represent three pieces of information and each of these three pieces of information may be encrypted as a separate encrypted message based on a unique decryption key.

FIG. 6B illustrates an exemplary GUI associated with a method for managing privacy of information on a shipping label associated with a shipment from the perspective of a sender of the shipment (sender GUI 610), according to an embodiment. A sender of a shipment may use sender GUI 610 to access limited shipping information, e.g., associated with the receiver. Similar to receiver GUI 600, sender GUI 610 may include a first section associated with a receiver's public information and a second section associated with a receiver's sensitive information or encrypted information.

The fields associated with the receiver's public information may include the receiver's nickname field 611, the receiver's city field 612, and the receiver's postal code (or ZIP code) field 613. However, sender GUI 610 may differ from receiver GUI 600 in that the fields associated with the receiver's public information may not be editable (with sender GUI 610).

The fields associated with the receiver's encrypted information may include the receiver's full name field 614, the receiver's detailed address field 615, and the receiver's phone number field 616. However, sender GUI 610 may differ from receiver GUI 600 in that the fields associated with the receiver's encrypted information are populated with ciphered text.

Sender GUI 610 may also include various buttons associated with an application associated with the GUI and/or delivery service, such as a confirmation button 607 and a cancellation button 608. For example, confirmation button 607 may be used to notify a delivery service that a sender has viewed and confirmed receiving the receiver's public information.

Figures 6C, 6D:
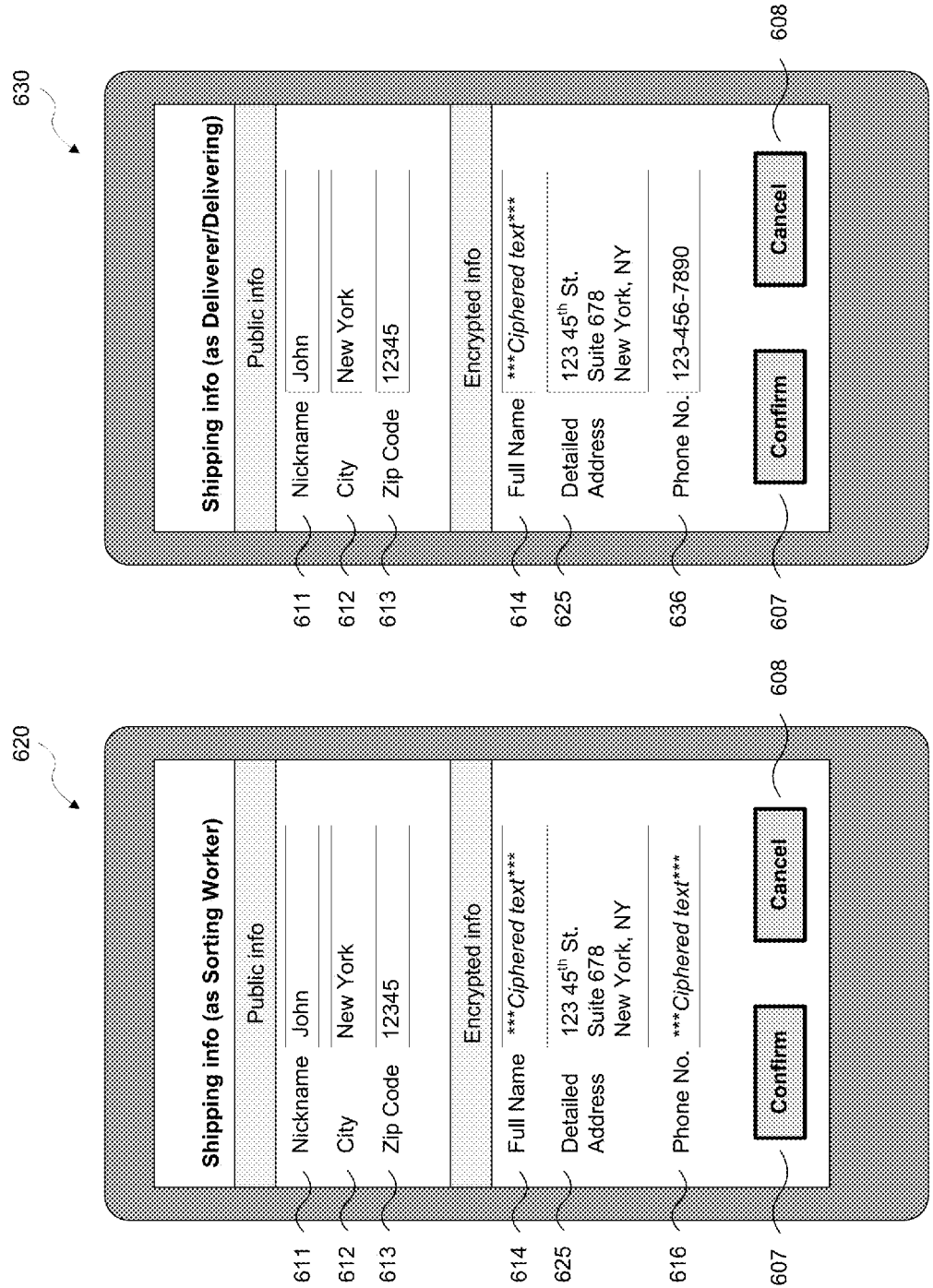

FIG. 6C illustrates an exemplary GUI associated with a method for managing privacy of information on a shipping label associated with a shipment from the perspective of a sorting worker of the shipment (sorting GUI 620), according to an embodiment. A sorting working may use sorting GUI 620 to access limited shipping information, e.g., associated with the receiver. Similar to sender GUI 610, sorting GUI 620 may include a first section associated with a receiver's public information (which may include fields that are not editable) and a second section associated with the receiver's sensitive information or encrypted information (which may include fields populated with ciphered text).

However, when the status of the shipment is in an appropriate state, e.g., in a sorting state, and the device associated with sorting GUI 620 has the appropriate decryption key, sorting GUI 620 may differ from sender GUI 610 in that one or more fields associated with the receiver's sensitive/encrypted information is decrypted. For example, the device associated with sorting GUI 620 may have the decryption key associated with the sorting state of the shipment and a field associated with information relevant to the sorting state may be decrypted, e.g., the receiver's decrypted detailed address field 625. The other encrypted fields may remain encrypted.

Sorting GUI 620 may also include various buttons associated with an application associated with the GUI and/or delivery service, such as a confirmation button 607 and a cancellation button 608. For example, confirmation button 607 (or another button) may be used to notify the delivery service that the sorting status of the shipment has commenced, is in progress, or has been completed.

FIG. 6D illustrates an exemplary GUI associated with a method for managing privacy of information on a shipping label associated with a shipment from the perspective of a delivery person of the shipment during a delivery state of the shipment (delivering GUI 630), according to an embodiment. A delivery person may use delivering GUI 630 to access limited shipping information, e.g., associated with the receiver. Similar to sender GUI 610, delivering GUI 630 may include a first section associated with a receiver's public information (which may include fields that are not editable) and a second section associated with the receiver's sensitive information or encrypted information (which may include fields populated with ciphered text).

However, when the status of the shipment is in an appropriate state, e.g., in a delivering state, and the device associated with delivering GUI 630 has the appropriate decryption key, delivering GUI 630 may differ from sender GUI 610 in that one or more fields associated with the receiver's sensitive/encrypted information is decrypted. For example, the device associated with delivering GUI 630 may have the decryption key associated with the delivering state of the shipment and a field associated with information relevant to the delivering state may be decrypted, e.g., the receiver's phone number field 635. The other encrypted fields may remain encrypted.

In one embodiment, a decryption key associated with an earlier status of the shipment may be transmitted to the device associated with another status of the shipment. For example, a device associated with delivering GUI 630 may also have the decryption key associated with the sorting status and the encrypted information associated with the sorting state may be decrypted, e.g., the receiver's decrypted detailed address field 625.

Delivering GUI 630 may also include various buttons associated with an application associated with the GUI and/or delivery service, such as a confirmation button 607 and a cancellation button 608. For example, confirmation button 607 (or another button) may be used to notify the delivery service that the delivering status of the shipment has commenced, is in progress, or has been completed.

Figure 6E:
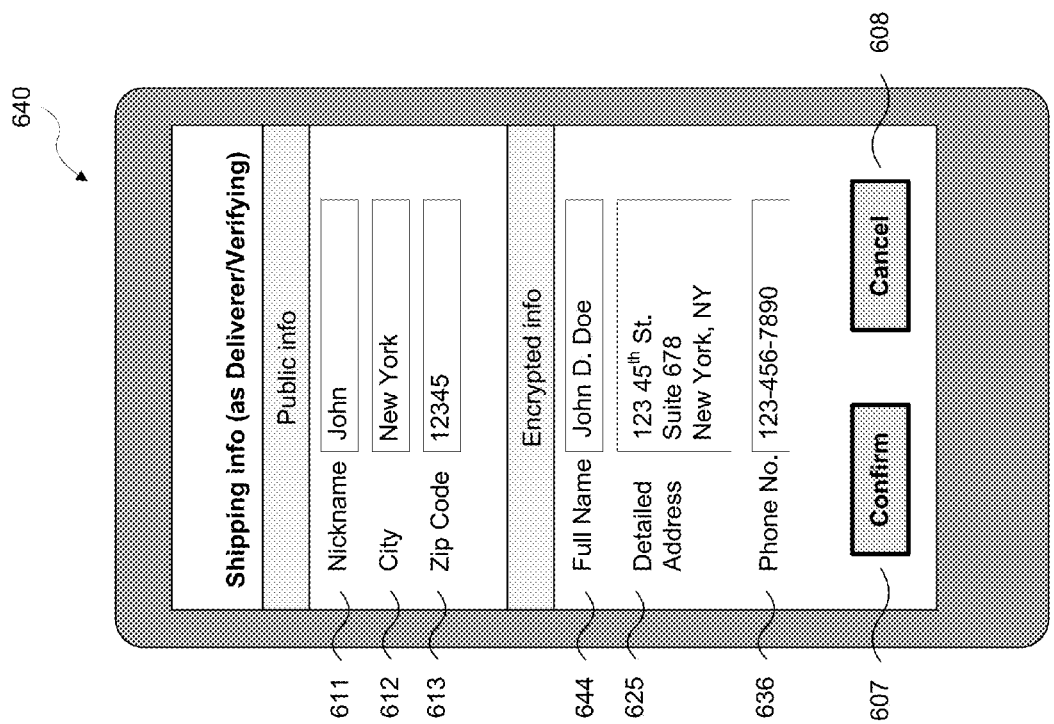

FIG. 6E illustrates an exemplary GUI associated with a method for managing privacy of information on a shipping label associated with a shipment from the perspective of a delivery person of the shipment during an identification verification state of the shipment (verifying GUI 640), according to an embodiment. Similar to delivering GUI 630, verifying GUI 640 may include a first section associated with a receiver's public information (which may include fields that are not editable) and a second section associated with the receiver's sensitive information or encrypted information (which may include fields populated with ciphered text).

However, when the status of the shipment is in an appropriate state, e.g., in a verifying state, and the device associated with verifying GUI 640 has the appropriate decryption key, verifying GUI 640 may differ from delivering GUI 630 in that another one or more fields associated with the receiver's sensitive/encrypted information is decrypted. For example, the device associated with verifying GUI 640 may have the decryption key associated with the verifying state of the shipment and a field associated with information relevant to the verifying state may be decrypted, e.g., the receiver's decrypted full name field 644. The other encrypted fields may remain encrypted.

In one embodiment, an application associated with one or more of the GUI's disclosed herein includes additional security features to limit access to encrypted information encoded in the one or more machine-readable codes included on the shipping label. For example, the application may obtain a decryption key and may also require that the shipment is in an appropriate status prior to decrypting a desired encrypted message encoded in the one or more machine-readable codes. In such embodiments, the application may prevent decryption of an encrypted message even though the application may have a corresponding decryption key because the shipment does not have the appropriate status, e.g., the shipment has been completed and the shipment status is closed. The status of a shipment may be communicated to the application, e.g., as a notification that is transmitted to/from other applications or devices associated with the delivery service.

In one embodiment, two or more encrypted messages are generated by encrypting at least two pieces of information, which may include at least one of a receiver and/or sender's full name, a receiver and/or sender's phone number, and a receiver and/or sender's detailed address.

In one embodiment, encrypted and non-encrypted information may be encoded in the machine-readable code (e.g., a two-dimensional, machine-readable code) on the shipping label. For example, one or more pieces of information may be encoded in a two-dimensional, machine-readable code that may be decoded by a scanner (or device configured to decode messages encoded in the two-dimensional, machine-readable code) without a decryption key or the like. In one embodiment, one or more of the visible, non-encrypted/non-encoded pieces of information on the shipping label may also be encoded in the machine-readable code. In one embodiment, one or more additional pieces of information (beyond the visible, non-encrypted/non-encoded pieces of information and the encrypted information) may be encoded in the machine-readable code.

In one embodiment, the machine-readable code is a two-dimensional, machine-readable code.

In one embodiment, a first decryption key is provided to a first user and a second decryption key is provided to a second user.

In one embodiment, a third encrypted message is encrypted based on a third decryption key, the third decryption key is associated with a third status of the shipment that is different from a first status of the shipment and a second status of the shipment, and the third encrypted message is included in the machine-readable code, and the method further includes providing the third decryption key based on the third status of the shipment.

In one embodiment, two or more encrypted messages are merged into one merged encrypted message.

In one embodiment, the shipping label is affixed to a package associated with the shipment.

In one embodiment, the shipping label includes non-encrypted information.

In one embodiment, at least two pieces of information include at least one of information associated with a receiver of the shipment and information associated with a sender of the shipment. In another embodiment, the machine-readable code contains information for the receiver of the shipment, and wherein the shipping label further includes an additional machine-readable code containing information for the sender of the shipment. In one embodiment, the additional machine-readable code is an additional two-dimensional, machine-readable code.

In one embodiment, providing the first decryption key comprises transmitting the first decryption key to a user associated with a first status of the shipment, and wherein providing the second decryption key comprises transmitting the second decryption key to a user associated with a second status of the shipment. In one embodiment, the user associated with the first status of the shipment is different from the user associated with the second status of the shipment.

In one embodiment, the method for managing privacy of information on a shipping label associated with a shipment further includes receiving a notification associated with the first status of the shipment. In another embodiment, the method further includes receiving a notification that the first status of the shipment is completed, and providing the second decryption key in response to the notification that the first status of the shipment is completed.

In another embodiment, the method further includes receiving a notification that the first status of the shipment is completed and providing the second decryption key in response to the notification that the first status of the shipment is completed, and receiving a notification that the second status of the shipment is completed and providing the third decryption key in response to the notification that the second status of the shipment is completed.

Figure 7:
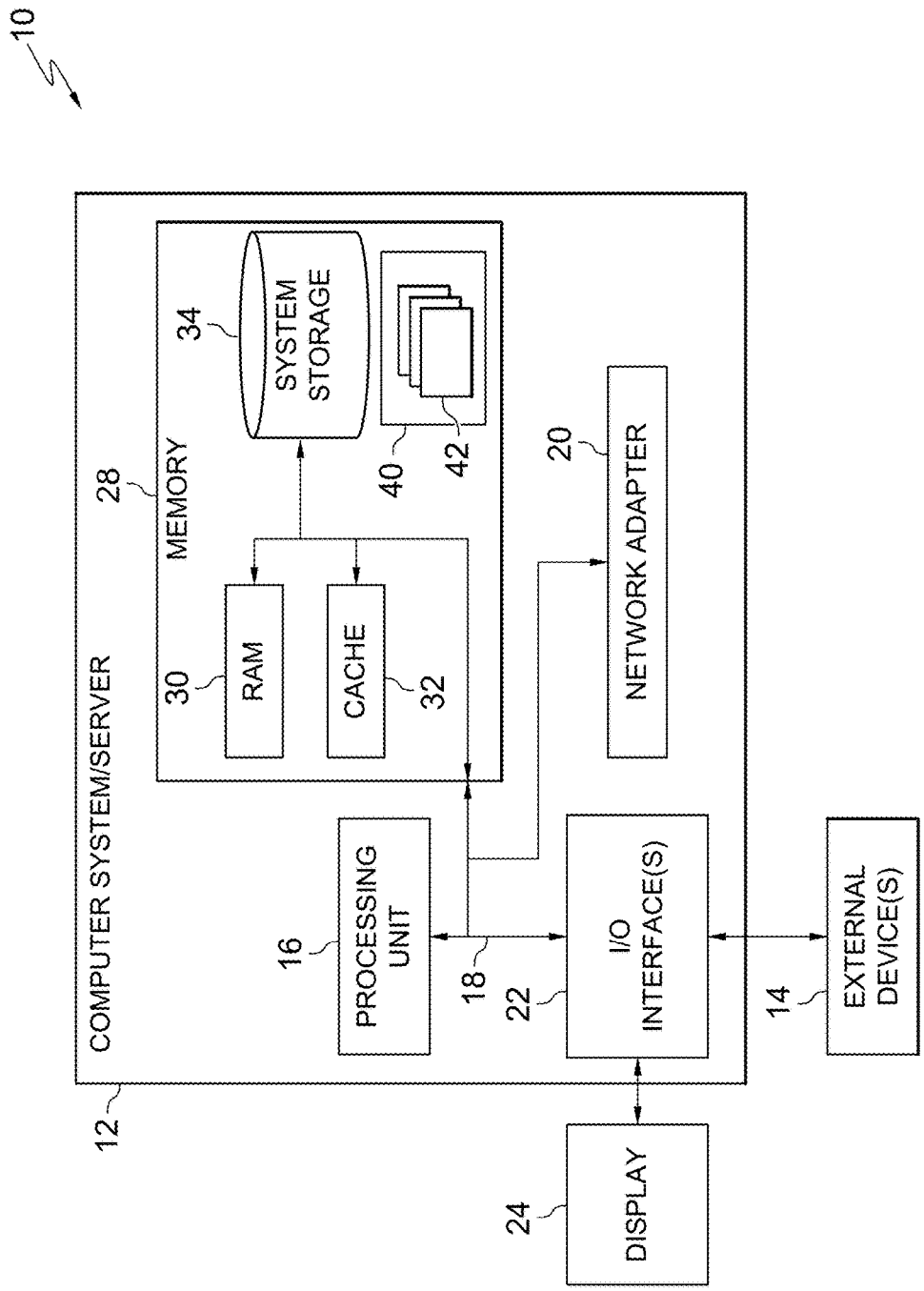
FIG. 7 is a block diagram illustrating a computing node, according to an aspect of the invention.

FIG. 7 depicts a schematic illustrating an example of a computing node. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 7, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for managing privacy of information on a shipping label associated with a shipment, the method comprising:
    receiving, by a shipping device, a plurality of pieces of information associated with the shipment;
    generating, by the shipping device, at least two decryption keys associated with at least two pieces of information from the plurality of pieces of information;
    generating, by the shipping device, two or more encrypted messages by encrypting the at least two pieces of information based on the at least two decryption keys, wherein a first encrypted message is encrypted based on a first decryption key and a second encrypted message is encrypted based on a second decryption key, and wherein the first decryption key is associated with a first status of the shipment that is different from a second status of the shipment associated with the second decryption key;
    generating, by the shipping device, a machine-readable code including the first and second encrypted messages;
    generating, by the shipping device, the shipping label, wherein the shipping label includes the machine-readable code;
    receiving, by the shipping device, the first status from a first user device, and sending the first decryption key to the first user device based on the first status of the shipment, thereby allowing the first user device to decode the first encrypted message from the shipping label; and
    receiving, by the shipping device, the second status from a second user device and sending the second decryption key to the second user device based on the second status of the shipment, thereby allowing the second user device to decode the second encrypted message from the shipping label.

2. The method according to claim 1, wherein the machine-readable code is a two-dimensional, machine-readable code.

3. The method according to claim 1, wherein a third encrypted message is encrypted based on a third decryption key, wherein the third decryption key is associated with a third status of the shipment that is different from the first status of the shipment and the second status of the shipment, and wherein the third encrypted message is included in the machine-readable code, and the method further comprising:
    providing the third decryption key based on the third status of the shipment.

4. The method according to claim 3, further comprising:
    receiving a notification that the first status of the shipment is completed, and
        wherein providing the second decryption key is in response to the notification that the first status of the shipment is completed, and
        receiving a notification that the second status of the shipment is completed, and wherein providing the third decryption key is in response to the notification that the second status of the shipment is completed.

5. The method according to claim 1, wherein the two or more encrypted messages are merged into one merged encrypted message.

6. The method according to claim 1, wherein the shipping label is affixed to a package associated with the shipment.

7. The method according to claim 1, wherein the shipping label includes non-encrypted information.

8. The method according to claim 1, wherein the at least two pieces of information include at least one of information associated with a receiver of the shipment and information associated with a sender of the shipment.

9. The method according to claim 1, further comprising:
    receiving a notification that the first status of the shipment completed, and wherein providing the second decryption key is in response to the notification that the first status of the shipment is completed.

10. A computer program product for managing privacy of information on a shipping label associated with a shipment, the computer program product comprising at least one computer readable non-transitory storage medium having computer readable program instructions thereon for execution by a processor, the computer readable program instructions comprising program instructions for:

receiving, by a shipping device, a plurality of pieces of information associated with the shipment, generating, by the shipping device, at least two decryption keys associated with at least two pieces of information from the plurality of pieces of information;

generating, by the shipping device, two or more encrypted messages by encrypting the at least two pieces of information based on the at least two decryption keys, wherein a first encrypted message is encrypted based on a first decryption key and a second encrypted message is encrypted based on a second decryption key, and wherein the first decryption key is associated with a first status of the shipment that is different from a second status of the shipment associated with the second decryption key;

generating, by the shipping device, a machine-readable code including the first and second encrypted messages;

generating, by the shipping device, the shipping label, wherein the shipping label includes the machine-readable code;

receiving, by the shipping device, the first status from a first user device and sending the first decryption key to the first user device based on the first status of the shipment, thereby allowing the first user device to decode the first encrypted from the shipping label, and receiving, by the shipping device, the second status from a second user device, and sending the second decryption key to the second user device based on the second status of the shipment, thereby allowing the second user device to decode the second encrypted message from the shipping label.

11. The computer program product according to claim 10, wherein the machine-readable code is a two-dimensional, machine-readable code.

12. The computer program product according to claim 10, wherein a third encrypted message is encrypted based on a third decryption key, wherein the third decryption key is associated with a third status of the shipment that is different from the first status of the shipment and the second status of the shipment, and wherein the third encrypted message is included in the machine-readable code, and the method further comprising:

providing the third decryption key based on the third status of the shipment.

13. A computer system for managing privacy of information on a shipping label associated with a shipment, the computer system comprising:

at least one processing unit;

at least one computer readable memory; at least one computer readable tangible, non-transitory storage medium; and program instructions stored on the at least one computer readable tangible, non-transitory storage medium for execution by the at least one processing unit via the at least one computer readable memory, wherein the program instructions comprise program instructions for:

receiving, by a shipping device, a plurality of pieces of information associated with the shipment;

generating, by the shipping device, at least two decryption keys associated with at least two pieces of information from the plurality of pieces of information;

generating, by the shipping device, two or more encrypted messages by encrypting the at least two pieces of information based on the at least two decryption keys, wherein a first encrypted message is encrypted based on a first decryption key and a second encrypted message is encrypted based on a second decryption key, and wherein the first decryption key is associated with a first status of the shipment that is different from a second status of the shipment associated with the second decryption key;

generating, by the shipping device, a machine-readable code including the first and second encrypted messages;

generating, by the shipment device, the shipping label, wherein the shipping label includes the machine-readable code;

receiving, by the shipping device, the first status from a first user device, and sending the first decryption key to the first user device based on the first status of the shipment, thereby allowing the first user device to decode the first encrypted message from the shipping label; and receiving, by the shipping device, the second status from a second user device, and sending the second decryption key to the second user device based on the second status of the shipment, thereby allowing the second user device to decode the second encrypted message from the shipping label.

14. The computer system according to claim 13, wherein the machine-readable code is a two-dimensional, machine-readable code.

15. The computer system according to claim 13, wherein a third encrypted message is encrypted based on a third decryption key, wherein the third decryption key is associated with a third status of the shipment that is different from the first status of the shipment and the second status of the shipment, and wherein the third encrypted message is included in the machine-readable code, and the method further comprising:

providing the third decryption key based on the third status of the shipment.

* * * * *